United States Patent Office 3,493,579
Patented Feb. 3, 1970

3,493,579
1,4-ETHANO-5H-[1]BENZOPYRANO [3,4-b]PYRIDINES
Robert E. Lyle, Jr., Durham, N.H., and Raj K. Razdan, Belmont, Felix E. Granchelli, Arlington, and Harry G. Pars, Lexington, Mass., assignors, by mesne assignments, to Arthur D. Little, Inc., Cambridge, Mass., a corporation of Massachusetts
No Drawing. Filed May 29, 1967, Ser. No. 642,188
Int. Cl. C07d 99/04; A61k 27/00
U.S. Cl. 260—294.3                    5 Claims

ABSTRACT OF THE DISCLOSURE

A new series of 1,4-ethano-1,2,3,4-tetrahydro-5H-[1] benzopyrano[3,4-b]pyridines and 1,4-ethano-1,2,3,4,13,14-hexahydro - 5H - [1]benzopyrano[3,4-b]pyridines, having C.N.S. and cardiovascular activity, and 1,4-ethano-5-oxo-1,2,3,4-tetrahydro - 5H - [1]benzopyrano[3,4-b]pyridines used as intermediates in the preparation thereof.

This invention relates to novel chemical compositions of matter known in the art of chemistry as 1,4-ethano-1,2,3,4-tetrahydro - 5H - [1]benzopyrano[3,4-b]pyridines and 1,4 - ethano-1,2,3,4,13,14-hexahydro-5H-[1]benzopyrano[3,4-b]pyridines having the Formulas Ia, b and IIa, b, respectively:

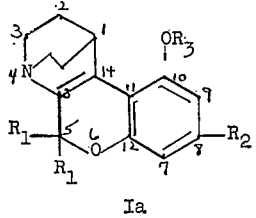

Ia

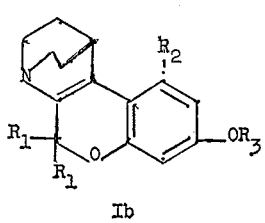

Ib

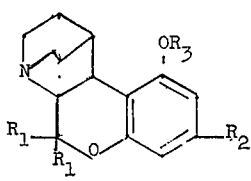

IIa

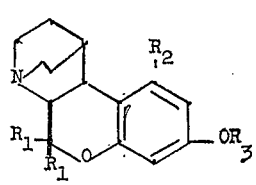

IIb and to 1,4-ethano-5-oxo-1,2,3,4-tetrahydro-5H-[1]benzopyrano-[3,4-b]pyridines, useful as intermediates for the preparation of the compounds of Formulas Ia, b and IIa, b, having the Formulas IIIa, b:

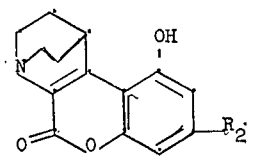

IIIa

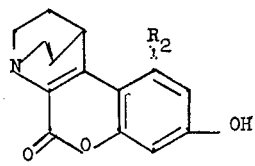

IIIb

In the compounds of Formulas Ia, b; IIa, b; and IIIa, b above, $R_1$ is lower-alkyl; $R_2$ is alkyl; and $R_3$ is hydrogen, lower-alkyl, lower-alkanoyl, carbamyl, N-lower-alkylcarbamyl, N,N-di-lower-alkylcarbamyl, or phosphonyl.

As used herein, the term "lower-alkyl" means saturated monovalent, aliphatic radicals, including straight or branched-chain radicals of from one to six carbon atoms, as illustrated by, but not limited to methyl, ethyl, propyl, isopropyl, butyl, sec.-butyl, amyl, hexyl, and the like.

As used herein, the term "alkfl" means saturated, monovalent, aliphatic radicals, including straight or branched-chain radicals of from one to twenty carbon atoms, as illustrated by, but not limited to methyl, n-amyl, n-hexyl, 2-heptyl, 3-methyl-2-octyl, n-octyl, 2-nonyl, 2-tetradecyl, n-hexadecyl, 2-eicosanyl, and the like.

As used herein, the term "lower-alkanoyl" means saturated, monovalent, aliphatic radicals derived from a monocarboxylic acid, including straight or branched-chain radicals of from one to six carbon atoms, as illustrated by, but not limited to formyl, acetyl, propionyl, α-methylpropionyl, butyryl, hexanoyl, and the like.

The compounds of Formulas Ia, b where $R_3$ is hydrogen are prepared by reacting an 8-alkyl-1,4-ethano,10-hydroxy-5-oxo-1,2,3,4-tetrahydro - 5H - [1]benzopyrano [3,4-b]pyridine or a 10-alkyl-1,4-ethano-8-hydroxy-5-oxo-1,2,3,4-tetrahydro - 5H - [1]benzopyrano[3,4-b]pyridine, having the respective Formulas IIIa and IIIb, with a lower-alkyl magnesium halide, as illustrated by the equation:

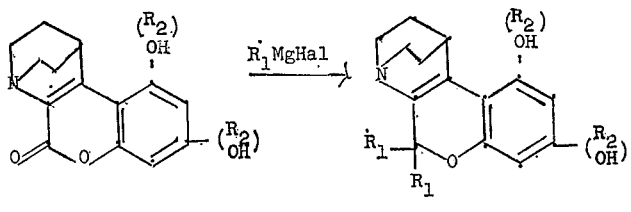

IIIa, b where $R_1$ and $R_2$ have the meanings given above, and Hal represents halogen. The reaction is carried out in an organic solvent inert under the conditions of the reaction, for example diethyl ether, dibutyl ether, tetrahydrofuran, anisole, pyridine, and the like. It is preferred to add a solution of the 8-alkyl-1,4-ethano-10-hydroxy-5-oxo-1,2,3,4-tetrahydro - 5H - [1]benzopyrano[3,4-b]pyridine or 10-alkyl-1,4-ethano-8-hydroxy-5-oxo - 1,2,3,4-tetrahydro-5H-[1]benzopyrano[3,4-b]pyridine of Formulas IIIa or IIIb, respectively, in a pyridine or anisole solution, or in a mixture of these solvents, to a solution of the Grignard reagent in anisole.

The compounds of Formula IIIa, b in turn are prepared by reacting a lower-alkyl 3-quinuclidinone-2-carboxylate of Formula IV with a 5-alkylresorcinol of Formula V. The reaction is carried out in a mixture of concentrated sulfuric acid and phosphorus oxychloride, or in the presence of other acidic condensation agents, such as aluminum chloride, hydrogen chloride, or polyphosphoric acid, and is illustrated by the equation:

a basic catalyst, with a lower-alkyl halide, to produce the compounds where $R_3$ is lower-alkyl; with a lower-alkanoic anhydride (or mixed anhydride), to produce the compounds where $R_3$ is lower-alkanoyl; with a molar equivalent of phosgene followed by reaction of the resulting chloroformate with ammonia, a lower-alkylamine, or a di-lower-alkylamine, to produce the compounds where $R_3$ is, respectively, carbamyl, N-lower-alkylcarbamyl, or N,

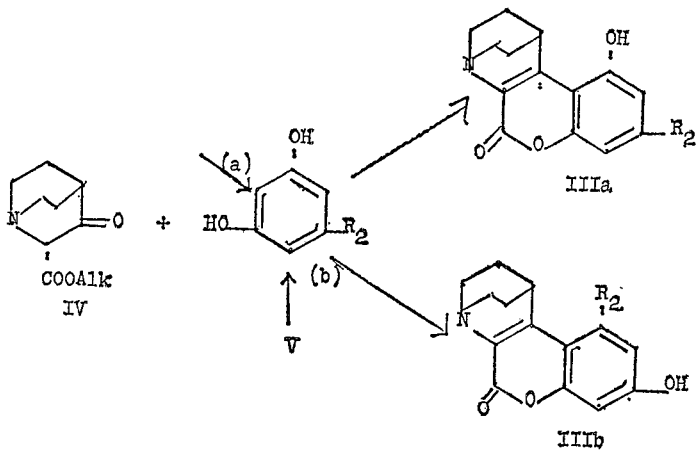

where $R_2$ has the meaning given above, and Alk is lower-alkyl.

As indicated by the reaction scheme above, the ring closure of the lower-alkyl 3-quinuclidinone-2-carboxylate with the 5-alkylresorcinol can taken place either by cyclization at the 2-position of the 5-alkylresorcinol, as indicated by arrow (a), to produce the 8-alkyl-1,4-ethano-10 - hydroxy-5-oxo-1,2,3,4-tetrahydro-5H - [1]benzopyrano[3,4-b]pyridines of Formula IIIa or by cyclization at the 4-position of the 5-alkylresorcinol, as indicated by hydroxy - 5-oxo-1,2,3,4-tetrahydro-5H - [1]benzopyrano [3,4-b]pyridines of Formula IIIb. Generally either the arrow (b), to produce the 10-alkyl-1,4-ethano-8- compounds of Formula IIIa or of Formula IIIb are produced from any particular 5-alkylresorcinol, but in cases where the 5-alkyl group contains branching on the carbon atom attached to the benzene ring, the predominant products are the compounds of Formula IIIa because the partial steric hindrance of the 4-position of the resorcinol by the adjacent branched 5-alkyl group inhibits cyclization at the 4-position.

The lower-alkyl 3-quinuclidinone-2-carboxylates of Formula IV and the 5-alkylresorcinols of Formula V, required as intermediates as described above, are known in the art.

The 8-alkyl-5,5-di-lower-alkyl-1,4-ethano-10 - hydroxy-1,2,3,4,13,14 - hexahydro-5H-[1]benzopyrano[3,4-b]pyridines and the 10-alkyl-5,5-di-lower-alkyl-1,4-ethano-8-hydroxy - 1,2,3,4,13,14-hexahydro-5H - [1]benzopyrano [3,4-b]pyridines of Formulas IIa and IIb, respectively, are prepared by reducing with hydrogen over a suitable catalyst the 8-alkyl-5,5-di-lower-alkyl-1,4-ethano-10-hydroxy - 1,2,3,4-tetrahydro-5H - [1]benzopyrano[3,4-b] pyridines and the 10-alkyl-5,5-di-lower-alkyl-1,4-ethano-8-hydroxy - 1,2,3,4-tetrahydro-5H-[1]benzopyrano[3,4 - b] pyridines of Formulas Ia and Ib, respectively, where $R_1$, $R_2$, and $R_3$ have the meanings given above. The reaction is carried out in an organic solvent inert under the conditions of the reaction, for example methanol, ethanol, isopropanol, and the like. Suitable catalysts include palladium-on-charcoal, platinum, Raney nickel, and the like. A preferred catalyst is Raney nickel.

The ester and ether derivatives of the compounds of Formulas Ia, b and IIa, b, that is the compounds where $R_3$ is lower-alkyl, lower-alkanoyl, carbamyl, N-lower-alkylcarbamyl, N-N-di-lower-alkylcarbamyl, or phosphonyl are prepared by reacting the corresponding compounds where $R_3$ is hydrogen, preferably in the presence of N-di-lower-alkylcarbamyl; or with one molar equivalent amount of phosphorus oxychloride followed by reaction of the resulting dichlorophosphinate with aqueous sodium or potassium carbonate, to produce the compounds where $R_3$ is phosphonyl. Suitable solvents are benzene, toluene, xylene, and the like, and suitable basic catalysts are alkali metal carbonates, bicarbonates, or hydroxides, dimethylaniline, pyridine, and the like.

The acid-addition salts of the bases herein described are the form in which the bases are most conveniently prepared for use and are the full equivalents of the subject matter specifically claimed. The acid moieties or anions in these salt forms are in themselves neither novel nor critical and therefore can be any acid anion or acid-like substance capable of salt formation with the free base form of the compounds.

The preferred type of salts are water-soluble pharmacologically-acceptable salts, that is, salts whose anions are relatively innocuous to the animal organisms in pharmacological doses of the salts, so that the beneficial physiological properties inherent in the free base are not vitiated by side effects ascribable to the anions; in other words, the latter do not substantially affect the pharmacological properties inherent in the cations. In practicing the invention, it has been found convenient to form the hydrochloride or hydriodide salt. However, other appropriate pharmacologically-acceptable salts within the scope of the invention are those derived from mineral acids such as hydrobromic acid, nitric acid, phosphoric acid, sulfamic acid, and sulfuric acid; and organic acids such as acetic acid, citric acid, tartaric acid, lactic acid, and the like, giving the hydrobromide, nitrate, phosphate, sulfamate, sulfate, acetate, citrate, tartrate, lactate, methanesulfonate, ethanesulfonate, and quinate, respectively.

Although pharmacologically-acceptable salts are preferred, those having toxic anions are also useful. All acid-addition salts are useful intermediates as sources of the free base form even if the particular salt per se is not desired as the final product, as for example when the salt is formed only for purposes of purification or identification, or when it is used as an intermediate in preparing a pharmacologically-acceptable salt by ion-exchange procedures.

The compounds of Formulas Ia, b and IIa, and b have been shown to possess C.N.S and cardiovascular activity as evidenced by gross overt changes induced by intravenous administration in mice in standard tests involving observations of psychomotor activity, reactivity to stimuli and ability to perform normal, non-conditioned motor tasks. This activity indicates their usefulness as psychotropic agents.

The compounds can be prepared for use by dissolving under sterile conditions, a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol, or oil solutions or oil-water emulsions in the same manner as conventional medicinal substances are prepared.

The molecular structures of the compounds of the invention were assigned on the basis of study of their infrared, ultraviolet, and NMR spectra and their transformation products, and confirmed by the correspondence between calculated and found values for the elementary analyses for representative examples.

The following examples will further illustrate the invention without, however, limiting it thereto.

EXAMPLE 1

5,5-dimethyl-1,4-ethano-10-hydroxy-8-(3-methyl-2-octyl)-1,2,3,4-tetrahydro-5H-[1]benzopyrano[3,4-b]pyridine (A) 1,4 - ETHANO-10-HYDROXY-8-(3-METHYL-2-OCTYL)-5 - OXO - 1,2,3,4-TETRAHYDRO-5H-[1]BENZOPYRANO-[3,4-b]PYRIDINE HYDROCHLORIDE Ethyl 3-quinuclidinone - 2 - carboxylate hydrochloride (37 g., 0.15 mole) was added in portions to 37 g. (0.15 mole) of 5-(3-methyl-2-octyl)resorcinol, and the mixture treated dropwise over a period of two hours and fifteen minutes with 75 ml. of concentrated sulfuric acid. Phosphorus oxychloride (30 ml.) was added all at once, and the mixture was stirred at room temperature for two and a half days. The reaction mixture was neutralized with aqueous sodium bicarbonate, extracted with a hexane/ether mixture, the extracts washed with aqueous sodium bicarbonate, then with water, dried, and saturated with anhydrous hydrogen chloride giving 4.1 g. of 1,4-ethano-10 - hydroxy - 8 - (3 - methyl - 2-octyl)-5-oxo-1,2,3,4-tetrahydro-5H-[1]benzopyrano [3,4 - b]pyridine hydrochloride as a colorless solid, M.P. 278–281° C.

*Analysis.*—Calcd. for $C_{23}H_{31}NO_3 \cdot HCl$: C, 68.05; H, 7.94; N, 3.44. Found: C, 67.85; H, 7.91; N, 3.41.

(B) 5,5-DIMETHYL - 1,4 - ETHANO - 10 - HYDROXY-8-(3-METHYL-2-OCTYL)-1,2,3,4 - TETRAHYDRO-5H-[1]BENZOPYRANO[3,4-b]PYRIDINE 1,4-ethano-10-hydroxy-8 - (3 - methyl-2-octyl)-5-oxo-1,2,3,4 - tetrahydro - 5H-[1]benzopyrano[3,4-b]pyridine hydrochloride (8.5 g., 0.021 mole) was converted to the free base (7.3 g., M.P. 112–116° C.), and the solution of the latter, in 70 ml. of dry anisole, was added dropwise to 0.25 mole of methyl magnesium iodide in 250 ml. of anisole. The reaction mixture was then stirred at 35° C. for sixteen hours, the excess Grignard reagent decomposed with 100 ml. of water, the mixture acidified with 250 ml. of 4 N sulfuric acid, and the anisole removed by steam distillation. The dark gummy material which separated from the main reaction mixture was collected and crystallized by trituration with acetonitrile giving 5,5-dimethyl-1,4-ethano-10-hydroxy - 8 - (3-methyl-2-octyl)-1,2,3,4-tetrahydro - 5H-[1]benzopyrano[3,4 - b]pyridine hydriodide, M.P. 280° C. A small amount, recrystallized from aqueous ethanol, afforded material of melting point 283° C.

*Analysis.*—Calcd. for $C_{25}H_{37}NO_2 \cdot HI$: C, 58.71; H, 7.48; N, 2.73. Found: C, 59.00; H, 7.75; N, 2.95.

The hydriodide salt was converted to the free base form and the latter recrystallized from acetonitrile giving the free base having M.P. 170.5–171.5° C.

*Analysis.*—Calcd. for $C_{25}H_{37}NO_2$: C, 78.28; H, 9.72; N, 3.65. Found: C, 78.25; H, 9.64; N, 3.38.

EXAMPLE 2

5,5-dihexyl-1,4-ethano-10-hydroxy-8-(3-methyl-2-octyl)-1,2,3,4-tetrahydro-5H-[1]benzopyrano[3,4-b]pyridine Following a procedure similar to that described in Example 1-B hereinabove, 1,4 - ethano-10-hydroxy-8-(3-methyl-2-octyl)-5-oxo - 1,2,3,4 - tetrahydro - 5H - [1] benzopyrano[3,4-b]pyridine is reacted with n-hexyl magnesium bromide in anisole to give 5,5-dihexyl-1,4-ethano-10 - hydroxy - 8 - (3 - methyl - 2 - octyl) - 1,2,3,4-tetrahydro-5H-[1]benzopyrano[3,4-b]pyridine.

EXAMPLE 3

1,4-ethano-10-hydroxy-5,5,8-trimethyl-1,2,3,4-tetrahydro-5H-[1]benzopyrano[3,4-b]pyridine (A) 1,4 - ETHANO-10-HYDROXY-8-METHYL-5-OXO-1,2,3,4-TETRAHYDRO-5H-[1]BENZOPYRANO[3,4-b]PYRIDINE Following a procedure similar to that described in Example 1-A hereinabove, ethyl 3 - quinuclidinone-2-carboxylate is reacted with 5-methylresorcinol in the presence of concentrated sulfuric acid and phosphorus oxychloride to give 1,4 - ethano - 10 - hydroxy-8-methyl-5-oxo-1,2,3,4-tetrahydro-5H[1]benzopyrano-[3,4]pyradine.

(B) 1,4 - ETHANO-10-HYDROXY-5,5,8-TRIMETHYL-1,2,3,4-TETRAHYDRO-5H-[1]BENZOPYRANO[3,4-b]PYRIDINE

Following a procedure similar to that described in Example 1-B hereinabove, 1,4-ethano-10-hydroxy-8-methyl-5 - oxo - 1,2,3,4 - tetrahydro - 5H - [1]benzopyrano[3,4-b]pyridine is reacted with methyl magnesium iodide in anisole to give 1,4 - ethano - 10-hydroxy-5,5,8-trimethyl-1,2,3,4-tetrahydro-5H-[1]benzopyrano[3,4-b]pyridine.

EXAMPLE 4

1,4-ethano-8-hydroxy-5,5,10-trimethyl-1,2,3,4-tetrahydro-5H-[1]benzopyrano[3,4-b]pyridine (A) 1,4 - ETHANO-8-HYDROXY-10-METHYL-5-OXO-1,2,3,4-TETRAHYDRO-5H-[1]BENZOPYRANO[3,4-b]PYRIDINE Following a procedure similar to that described in Example 1-A hereinabove, ethyl 3-quinuclidinone-2-carboxylate is reacted with 5-methylresorcinol in the presence of concentrated sulfuric acid and phosphorus oxychloride to give 1,4 - ethano - 8-hydroxy-10-methyl-5-oxo-1,2,3,4-tetrahydro-5H-[1]benzopyrano[3,4-b]pyridine.

(B) 1,4 - ETHANO-8-HYDROXY-5,5,10-TRIMETHYL-1,2,3,4-TETRAHYDRO-5H-[1]BENZOPYRANO[3,4-b]PYRIDINE

Following a procedure similar to that described in Example 1-B hereinabove, 1,4-ethano-8-hydroxy-10-methyl-5 - oxo - 1,2,3,4 - tetrahydro-5H-[1]benzopyrano[3,4-b] pyridine is reacted with methyl magnesium iodide in anisole to give 1,4-ethano-8-hydroxy-5,5,10-trimethyl-1,2,3,4-tetrahydro-5H-[1]benzopyrano[3,4-b]pyridine.

EXAMPLE 5

5,5-dimethyl-1,4-ethano-8-hexyl-10-hydroxy-1,2,3,4-tetrahydro-5H-[1]benzopyrano[3,4-b]pyridine (A) 1,4-ETHANO-8-HEXYL - 10 - HYDROXY-5-OXO-1,2,3,4-TETRAHYDRO-5H-[1]BENZOPYRANO[3,4-b]PYRIDINE Following a procedure similar to that described in Example 1-A hereinabove, ethyl 3-quinuclidinone-2-carboxylate is reacted with 5-hexylresorcinol in the presence of concentrated sulfuric acid and phosphorus oxychloride to give 1,4-ethano-8-hexyl-10-hydroxy-5-oxo-1,2,3,4-tetrahydro-5H-[1]benzopyrano[3,4-b]pyridine.

(B) 5,5 - DIMETHYL-1,4-ETHANO-8-HEXYL-10-HYDROXY-1,2,3,4 - TETRAHYDRO - 5H - [1]BENZOPYRANO[3,4-b] PYRIDINE

Following a procedure similar to that described in Example 1-B hereinabove, 1,4-ethano-8-hexyl-10-hydroxy-5-oxo - 1,2,3,4 - tetrahydro - 5H - [1]benzopyrano[3,4-b] pyridine is reacted with methyl magnesium iodide in anisole to give 5,5 - dimethyl - 1,4 - ethano-8-hexyl-10-hydroxy - 1,2,3,4 - tetrahydro-5H-[1]benzopyrano[3,4-b] pyridine.

EXAMPLE 6

5,5 - dimethyl - 1,4 - ethano - 10 - hexyl - 8 - hydroxy - 1, 2,3,4 - tetrahydro - 5H - [1]benzopyrano[3,4-b]pyridine (A) 1,4 - ETHANO - 10 - HEXYL - 8 - HYDROXY - 5 - OXO-1,2,3,4 - TETRAHYDRO - 5H - [1]BENZOPYRANO[3,4 - b] PYRIDINE Following a procedure similar to that described in Example 1-A hereinabove, ethyl 3-quinuclidinone - 2 - carboxylate is reacted with 5 - hexylresorcinol in the presence of concentrated sulfuric acid and phosphorus oxychloride to give 1,4 - ethano - 10 - hexyl - 8 - hydroxy-5-oxo - 1,2,3,4 - tetrahydro - 5H - [1]benzopyrano [3,4-b] pyridine.

(B) 5,5 - DIMETHYL - 1,4 - ETHANO - 10 - HEXYL - 8-HYDROXY - 1,2,3,4 - TETRAHYDRO - 5H - [1]BENZOPYRANO[3,4-b]PYRIDINE

Following a procedure similar to that described in Example 1-B hereinabove, 1,4-ethano-10-hexyl-8-hydroxy - 5 oxo - 1,2,3,4 - tetrahydro - 5H - [1]benzopyrano [3,4-b]pyridine is reacted with methyl magnesium iodide in anisole to give 5,5 - dimethyl - 1,4 - ethano - 10 - hexyl-8 - hydroxy - 1,2,3,4 - tetrahydro - 5H - [1]benzopyrano- [3,4-b]pyridine.

EXAMPLE 7

5,5 - dimethyl - 8 - (2 - eicosanyl) - 1,4 - ethano - 10 - hydroxy - 1,2,3,4 - tetrahydro - 5H - [1]benzopyrano [3,4 - b]pyridine (A) 8 - (2 - EICOSANYL) - 1,4 - ETHANO - 10 - HYDROXY-5 - OXO - 1,2,3,4 - TETRAHYDRO - 5H - [1]BENZOPYRANO[3,4-b]PYRIDINE Following a procedure similar to that described in Example 1-A hereinabove, ethyl 3-quinuclidinone - 2 - carboxylate is reacted with 5 - (2 - eicosanyl)resorcinol in the presence of concentrated sulfuric acid and phosphorus oxychloride to give 8 - (2 - eicosanyl) - 1,4 - ethano - 10-hydroxy - 5 - oxo - 1,2,3,4 - tetrahydro - 5H - [1]benzopyrano[3,4-b]pyridine.

(B) 5,5 - DIMETHYL - 8 - (2 - EICOSANYL)-1,4-ETHIANO-10 - HYDROXY - 1,2,3,4 - TETRAHYDRO - 5H[1]BENZOPYRANO[3,4-b]PYRIDINE

Following a procedure similar to that described in Example 1-B hereinabove, 8 - (2 - eicosanyl) - 1,4 - ethano-10 - hydroxy - 5 - oxo - 1,2,3,4 - tetrahydro - 5H - [1] benzopyrano [3,4 - b]pyridine is reacted with methyl magnesium iodide in anisole to give 5,5 - dimethyl - 8- (2 - eicosanyl) - 1,4 - ethano - 10 - hydroxy - 1,2,3,4-tetrahydro - 5H - [1]benzopyrano[3,4 - b]pyridine.

EXAMPLE 8

10 - acetoxy - 5,5 - dimethyl - 1,4 - ethano - 8 - (3-methyl-2 - octyl) - 1,2,3,4 - tetrahydro - 5H - [1]benzopyrano [3,4-b]pyridine By reacting 5,5 - dimethyl - 1,4 - ethano - 10 - hydroxy-8 - (3 - methyl - 2 - octyl) - 1,2,3,4 - tetrahydro - 5H - [1] benzopyrano[3,4, - b] - pyridine with acetic anhydride, there is obtained 10 - acetoxy - 5,5 - dimethyl-1,4-ethano-8 - (3 - methyl - 2 - octyl) - 1,2,3,4-tetrahydro - 5H - [1] benzopyrano[3,4-b]pyridine.

EXAMPLE 9

8 - acetoxy - 1,4 - ethano - 5,5,10 - trimethyl - 1,2,3,4 - tetrahydro - 5H - [1]benzopyrano - [3,4-b]pyridine By reacting 1,4 - ethano - 8 - hydroxy - 5,5,10-trimethyl-1,2,3,4 - tetrahydro - 5H - [1]benzopyrano[3,4 - b]pyridine with acetic anhydride, there is obtained 8 - acetoxy - 1,4 - ethano - 5,5,10 - trimethyl - 1,2,3,4 - tetrahydro-5H - [1]benzopyrano[3,4 - b]pyridine.

EXAMPLE 10

5,5 - dimethy - 1,4 - ethano - 10 - methoxy - 8 - (3-methyl-2 - octyl) - 1,2,3,4 - tetrahydro - 5H - [1]benzopyrano [3,4-b]pyridine By reacting 5,5 - dimethyl - 1,4 - ethano - 10 - hydroxy-8 - (3 - methyl - 2 - octyl) - 1,2,3,4 - tetrahydro - 5H-[1] benzopyrano[3,4 - b] - pyridine with methyl iodine in the presence of sodium ethoxide, there is obtained 5,5 - dimethyl - 1,4 - ethano - 10 - methoxy - 8 - (3 - methyl - 2-octyl) - 1,2,3,4 - tetrahydro - 5H - [1]benzopyrano[3, 4 - b]pyridine.

EXAMPLE 11

1,4 - ethano - 8 - methoxy - 5,5,10 - trimethyl - 1,2,3,4-tetrahydro - 5H - [1]benzopyrano - [3,4-b]pyridine By reacting 1,4 - ethano - 8 - hydroxy - 5,5,10 - trimethyl - 1,2,3,4 - tetrahydro - 5H - [1]benzopyrano[3, 4 - b]pyridine with methyl iodide in the presence of sodium ethoxide, there is obtained 1,4-ethano-8-methoxy-5,5,10 - trimethyl - 1,2,3,4 - tetrahydro - 5H - [1]benzopyrano[3,4-b]pyridine.

EXAMPLE 12

10 carbamyloxy - 5,5 - dimethyl - 1,4 - ethano - 8 - (3-methyl - 2 - octyl) - 1,2,3,4-tetrahydro -5H - [1]benzopyrano[3,4-b]pyridine By reacting 5,5 - dimethyl - 1,4 - ethano - 10 - hydroxy-8 - (3 - methyl - 2 - octyl) - 1,2,3,4 - tetrahydro - 5H[1] benzopyrano[3,4-b]-pyridine with an equimolar amount of phosgene in the presence of dimethylaniline, and reacting the resulting chloroformate with liquid ammonia, there is obtained 10 - carbamyloxy - 5,5 - dimethyl - 1,4-ethano - 8 - (3 - methyl - 2 - octyl) - 1,2,3,4 - tetrahydro - 5H - [1]benzopyrano[3,4-b]pyridine.

EXAMPLE 13

8 - carbamyloxy - 1,4 - ethano - 5,5,10 - trimethyl - 1,2,3, 4 - tetrahydro - 5H - [1]benzopyrano[3,4-b]pyridine By reacting 1,4 - ethano - 8 - hydroxy - 5,5,10(trimethyl - 1,2,3,4 - tetrahydro - 5H - [1]benzopyrano[3, 4-b]pyridine with an equimolar amount of phosgene in the presence of dimethylaniline, and reacting the resulting chloroformate with liquid ammonia, there is obtained 8-carbamyloxy - 1,4 - ethano - 5,5,10 - trimethyl - 1,2,3,4-tetrahydro - 5H - [1]benzopyrano[3,4-b]pyridine.

EXAMPLE 14

5,5 - dimethyl - 1,4 - ethano-10-(N-methylcarbamyloxy)-8 - (3 methyl - 2 - octyl) - 1,2,3,4 - tetrahydro - 5H- [1]benzopyrano[3,4-b]pyridine By reacting 5,5 - dimethyl - 1,4 - ethano - 10 - hydroxy-8 - (3 - methyl - 2 - octyl) - 1,2,3,4 - tetrahydro - 5H[1] benzopyrano - [3,4-b]pyridine with an equimolar amount of phosgene in the presence of dimethylaniline, and reacting the resulting chloroformate with methylamine, there is obtained 5,5 - dimethyl - 1,4, - ethano - 10 - (N-methylcarbamyloxy) - 8 - (3 - methyl - 2 - octyl) - 1,2,3, 4 - tetrahydro - 5H - [1]benzopyrano[3,4-b]pyridine.

EXAMPLE 15

1,4 - ethano - 8 - (N - methylcarbamyloxy) - 5,5,10-trimethyl - 1,2,3,4 - tetrahydro - 5H - [1]benzopyrano- [3,4-b]pyridine By reacting 1,4 - ethano - 8 - hydroxy - 5,5,10 - trimethyl - 1,2,3,4 - tetrahydro - 5H - [1]benzopyrano[3, 4-b]pyridine with an equimolar amount of phosgene in the presence of dimethylaniline, and reacting the resulting chloroformate with methylamine, there is obtained 1, 4 - ethano - 8 - (N - methylcarbamyloxy) - 5,5,10 - trimethyl - 1,2,3,4 - tetrahydro - 5H - [1]benzopyrano[3, 4-b]pyridine.

EXAMPLE 16

5,5 - dimethyl - 10 - (N,N - dimethylcarbamyloxy) - 1,4-ethano - 8 - (3 - methyl - 2 - octyl) - 1,2,3,4 - tetrahydro - 5H - [1]benzopyrano[3,4-b]pyridine By reacting 5,5 - dimethyl - 1,4 - ethano - 10 - hydroxy-8 - (3 - methyl - 2 - octyl) - 1,2,3,4 - tetrahydro - 5H - [1]benzopyrano - [3,4-b]pyridine with an equimolar amount of phosgene in the presence of dimethylaniline, and reacting the resulting chloroformate with dimethylamine, there is obtained 5,5 - dimethyl - 10 - (N,N - dimethylcarbamyloxy - 1,4 - ethano - 8 - (3 - methyl - 2 - octyl)-1,2,3,4 - tetrahydro - 5H-[1]benzopyrano[3,4-b]pyridine.

EXAMPLE 17

8 - (N,N - dimethylcarbamyloxy) - 1,4-ethano-5,5,10-trimethyl - 1,2,3,4-tetrahydro-5H-[1]benzopyrano[3,4-b]pyridine By reacting 1,4 - ethano - 8-hydroxy-5,5,10-trimethyl-1,2,3,4 - tetrahydro - 5H-[1]benzopyrano[3,4-b]pyridine with an equimolar amount of phosgene in the presence of dimethylaniline, and reacting the resulting chloroformate with dimethylamine, there is obtained 8-(N,N-dimethylcarbamyloxy) - 1,4-ethano-5,5,10-trimethyl-1,2,3,4-tetrahydro-5H-[1]benzopyrano[3,4-b]pyridine.

EXAMPLE 18

5,5 - dimethyl - 1,4-ethano-8-(3-methyl-2-octyl)-10-phosphonyloxy - 1,2,3,4 - tetrahydro - 5H-[1]-benzopyrano[3,4-b]pyridine By reacting 5,5-dimethyl-1,4-ethano-10-hydroxy-8-(3-methyl - 2-octyl) - 1,2,3,4-tetrahydro-5H-[1]benzopyrano[3,4-b]-pyridine with one molar equivalent amount of phosphorus oxychloride in toluene in the presence of pyridine, and reacting the resulting dichlorophosphinate with aqueous potassium carbonate, there is obtained 5,5-dimethyl - 1,4-ethano-8-(3-methyl-2-octyl)-10-phosphonyloxy - 1,2,3,4 - tetrahydro - 5H - [1]benzopyrano[3,4-b]pyridine.

EXAMPLE 19

1,4-ethano-8-phosphonyloxy-5,5,10-trimethyl-1,2,3,4-tetrahydro-5H-[1]benzopyrano[3,4-b]-pyridine By reacting 1,4 - ethano - 8-hydroxy-5,5,10-trimethyl-1,2,3,4 - tetrahydro - 5H-[1]benzopyrano[3,4-b]pyridine with one molar equivalent amount of phosphorus oxychloride in toluene in the presence of pyridine, and reacting the resulting dichlorophosphinate with aqueous potassium carbonate, there is obtained 1,4-ethano-8-phosphonyloxy - 5,5,10 - trimethyl-1,2,3,4-tetrahydro-5H-[1]benzopyrano[3,4-b]pyridine.

EXAMPLE 20

5,5 - dimethyl - 1,4-ethano-10-hydroxy-8-(3-methyl-2-octyl) - 1,2,3,4,13,14 - hexahydro - 5H-[1]benzopyrano[3,4-b]pyridine is obtained by catalytic reduction over Raney nickel of 5,5-dimethyl-1,4-ethano-10-hydroxy-8-(3 - methyl - 2 - octyl)-1,2,3,4-tetrahydro-5H-[1]benzopyrano[3,4-b]pyridine.

EXAMPLE 21

By reducing with hydrogen over a Raney nickel catalyst the compounds of Examples 2, 3-B, 4-B, 5-B, 6-B, 7-B, and 8–19, following the procedure described above in Example 20, there is obtained the following respective compounds of Formulas IIa, b:

(A) 5,5 - dihexyl-1,4-ethano-10-hydroxy-8-(3-methyl-2 - octyl) - 1,2,3,4,13,14-hexahydro-5H-[1]benzopyrano [3,4-b]pyridine.

(B) 1,4 - ethano-10-hydroxy-5,5,8-trimethyl-1,2,3,4,13,14-hexahydro-5H-[1]benzopyrano[3,4-b]pyridine.

(C) 1,4 - ethano-8-hydroxy-5,5,10-trimethyl-1,2,3,4,13,14-hexahydro-5H-[1]benzopyrano[3,4-b]pyridine.

(D) 5,5 - dimethyl - 1,4 - ethano-8-hexyl-10-hydroxy-1,2,3,4,13,14 - hexahydro-5H-[1]benzopyrano[3,4-b]pyridine.

(E) 5,5 - dimethyl - 1,4 - ethano-10-hexyl-8-hydroxy-1,2,3,4,13,14 - hexahydro-5H-[1]benzopyrano[3,4-b]pyridine.

(F) 5,5 - dimethyl - 8-(2-eicosanyl)-1,4-ethano-10-hydroxy - 1,2,3,4,13,14 - hexahydro - 5H-[1]benzopyrano [3,4-b]pyridine.

(G) 10 - acetoxy-5,5-dimethyl-1,4-ethano-8-(3-methyl-2 - octyl) - 1,2,3,4,13,14-hexahydro-5H-[1]benzopyrano [3,4-b]pyridine.

(H) 8 - acetoxy-1,4-ethano-5,5,10-trimethyl-1,2,3,4,13,14-hexahydro-5H-[1]benzopyrano[3,4-b]pyridine.

(J) 5,5 - dimethyl-1,4-ethano-10-methoxy-8-(3-methyl-2 - octyl) - 1,2,3,4,13,14-hexahydro-5H-[1]benzopyrano [3,4-b]pyridine.

(K) 1,4 - ethano-8-methoxy-5,5,10-trimethyl-1,2,3,4,13,14 - hexahydro - 5H-[1]benzopyrano[3,4-b]pyridine.

(L) 10 - carbamyloxy - 5,5-dimethyl-1,4-ethano-8-(3-methyl - 2-octyl) - 1,2,3,4,13,14-hexahydro-5H-[1]benzopyrano[3,4-b]pyridine.

(M) 8 - carbamyloxy - 1,4 - ethano-5,5,10-trimethyl-1,2,3,4,13,14 - hexahydro - 5H - [1]benzopyrano[3,4-b] pyridine.

(N) 5,5 - dimethyl - 1,4-ethano-10-(N-methylcarbamyloxy) - 8 - (3-methyl-2-octyl)-1,2,3,4,13,14-hexahydro-5H-[1]benzopyrano[3,4-b]pyridine.

(O) 1,4 - ethano - 8-(N-methylcarbamyloxy)-5,5,10-trimethyl - 1,2,3,4,13,14 - hexahydro-5H-[1]benzopyrano [3,4-b]pyridine.

(P) 5,5 - dimethyl - 10-(N,N-dimethylcarbamyloxy)-1,4 - ethano-8-(3-methyl-2-octyl)-1,2,3,4,13,14 - hexahydro-5H-[1]benzopyrano[3,4-b]pyridine.

(Q) 8 - (N,N - dimethylcarbamyloxy) - 1,4 - ethano-5,5,10 - trimethyl - 1,2,3,4,13,14-hexahydro-5H-[1]benzopyrano[3,4-b]pyridine.

(R) 5,5 - dimethyl - 1,4-ethano-8-(3-methyl-2-octyl)-10 - phosphonyloxy - 1,2,3,4,13,14 - hexahydro - 5H-[1] benzopyrano[3,4-b]pyridine.

(S) 1,4 - ethano - 8 - phosphonyloxy-5,5,10-trimethyl-1,2,3,4,13,14 - hexahydro - 5H - [1]benzopyrano[3,4-b] pyridine.

We claim:
1. A compound having the formula:

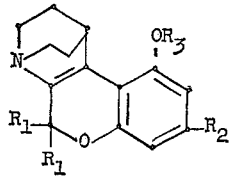 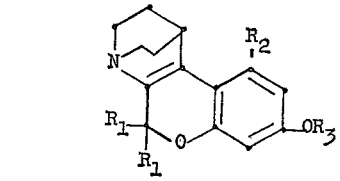

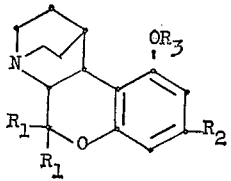 or 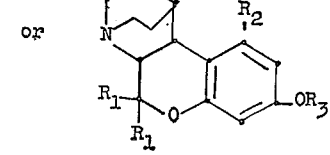

where $R_1$ is lower-alkyl; $R_2$ is alkyl of from one to twenty carbon atoms; and $R_3$ is hydrogen, lower-alkyl, lower-alkanoyl, carbamyl, N - lower - alkylcarbamyl, N,N-di-lower-alkylcarbamyl, or phosphonyl.

2. A compound according to claim 1 where $R_3$ is hydrogen.

3. 5,5 - dimethyl - 1,4-ethano-10-hydroxy-8-(3-methyl-2 - octyl)-1,2,3,4-tetrahydro-5H-[1]benzopyrano [3,4-c] pyridine according to claim 2 where $R_1$ as lower-alkyl is methyl; and $R_2$ as alkyl is 3-methyl-2-octyl.

4. A compound having the formula:

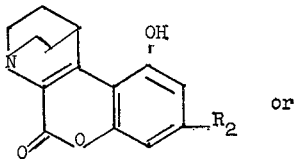 or 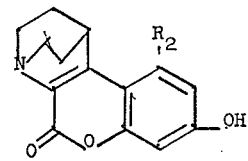

where $R_2$ is alkyl of from one to twenty carbon atoms.

5. 1,4 - ethano - 10-hydroxy-8-(3-methyl-2-octyl)-5-oxo - 1,2,3,4 - tetrahydro-5H-[1]benzopyrano[3,4-b]pyridine according to claim 4 where $R_2$ as alkyl is 3-methyl-2-octyl.

References Cited

UNITED STATES PATENTS 3,429,889   2/1969   Shulgin _____ 260—295

HENRY R. JILES, Primary Examiner

G. THOMAS TODD, Assistant Examiner

U.S. Cl. X.R.

260—999